United States Patent
Soman et al.

(10) Patent No.: US 11,755,349 B2
(45) Date of Patent: *Sep. 12, 2023

(54) SECURE DIGITAL WORKSPACE USING MACHINE LEARNING AND MICROSEGMENTATION

(71) Applicant: VMware, Inc., Palo Alto, CA (US)

(72) Inventors: Sisimon Soman, Sunnyvale, CA (US); Matthew Conover, Mountain View, CA (US); Arindam Nag, San Ramon, CA (US)

(73) Assignee: VMWARE, INC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/516,066

(22) Filed: Nov. 1, 2021

(65) Prior Publication Data

US 2022/0058039 A1 Feb. 24, 2022

Related U.S. Application Data

(63) Continuation of application No. 16/249,511, filed on Jan. 16, 2019, now Pat. No. 11,194,600.

(51) Int. Cl.
*H04L 9/40* (2022.01)
*G06F 9/451* (2018.01)
(Continued)

(52) U.S. Cl.
CPC .............. *G06F 9/452* (2018.02); *G06N 20/00* (2019.01); *H04L 63/02* (2013.01); *H04L 63/083* (2013.01);
(Continued)

(58) Field of Classification Search
CPC ....... G06F 9/452; G06F 9/45541; G06F 21/31; G06N 20/00; G06N 20/20; G06N 5/003;
(Continued)

(56) References Cited

U.S. PATENT DOCUMENTS 7,849,502 B1  12/2010  Bloch et al.
8,942,431 B2  1/2015  Forero et al.
(Continued)

OTHER PUBLICATIONS

U.S. Appl. No. 15/879,150, filed Jan. 24, 2018 and entitled "Remote Session Based Mirco-Segmentation".
(Continued)

*Primary Examiner* — Khoi V Le
(74) *Attorney, Agent, or Firm* — Patterson + Sheridan, LLP

(57) ABSTRACT

The disclosure provides an approach for authenticating a user of a computer system, wherein the computer system implements a virtual desktop infrastructure (VDI), the method comprising connecting to a computing device through a network, receiving from the computing device authentication credentials, and determining whether the authentication credentials match an authorized user of the computer system. The approach further comprises extracting from the computing device features of the computing device, retrieving a machine learning (ML) model associated with the authorized user, wherein the ML model is at least one of (a) a supervised ML model or (b) an unsupervised ML model, and executing the ML model to authenticate the features of the computing device.

20 Claims, 6 Drawing Sheets

(51) Int. Cl.
*G06N 20/00* (2019.01)
*G06F 9/455* (2018.01)

(52) U.S. Cl.
CPC ........ *H04L 63/0876* (2013.01); *H04L 63/102* (2013.01); *H04L 63/105* (2013.01); *G06F 9/45541* (2013.01); *H04L 2463/082* (2013.01)

(58) Field of Classification Search
CPC ... H04L 63/02; H04L 63/083; H04L 63/0876; H04L 63/102; H04L 63/105; H04L 63/1433; H04L 63/0861; H04L 2463/082; H04W 12/06; H04W 12/60
See application file for complete search history.

(56) References Cited

U.S. PATENT DOCUMENTS

| | | | |
|---|---|---|---|
| 9,547,760 | B2 | 1/2017 | Kang et al. |
| 10,044,761 | B2 * | 8/2018 | Ducatel ............... H04L 63/0861 |
| 10,846,117 | B1 | 11/2020 | Steinberg |
| 10,924,514 | B1 * | 2/2021 | Altman .................... G06N 7/01 |
| 2009/0279547 | A1 | 11/2009 | Mistry et al. |
| 2012/0011284 | A1 | 1/2012 | Filali-Adib et al. |
| 2012/0317566 | A1 | 12/2012 | Santos et al. |
| 2015/0199513 | A1 | 7/2015 | Ismael et al. |
| 2015/0358288 | A1 | 12/2015 | Jain et al. |
| 2016/0110211 | A1 | 4/2016 | Kames |
| 2016/0216860 | A1 | 7/2016 | Beveridge |
| 2016/0380848 | A1 | 12/2016 | Raney |
| 2017/0118102 | A1 | 4/2017 | Majumder et al. |
| 2017/0171159 | A1 | 6/2017 | Kumar et al. |
| 2018/0115586 | A1 | 4/2018 | Chou et al. |
| 2018/0123907 | A1 | 5/2018 | Raman et al. |
| 2018/0176102 | A1 | 6/2018 | Bansal et al. |
| 2019/0230064 | A1 | 7/2019 | Soman |
| 2019/0245877 | A1 * | 8/2019 | Toth .................... H04L 63/1425 |
| 2020/0073694 | A1 | 3/2020 | Wallach |

OTHER PUBLICATIONS

U.S. Appl. No. 15/708,352, filed Sep. 19, 2017 and entitled "Attribute Enhancement for Handling Network Packet Traffic Between Micro Segmented Guests".

Anwar, Mahwish, Virtual Firewalling for Migrating Virtual Machines in Cloud Computing, Dec. 14-15, 2013, IEEE Xplore, INSPEC#14080059.

Maheswari, Ritu et al., Private Virtual Cloud Infrastructure Modelling using "VCPHCF-RTT" Security Agent, Dec. 14-15, 2018, IEEE Xplore, INSPEC#18868600.

* cited by examiner

SECURE DIGITAL WORKSPACE USING MACHINE LEARNING AND MICROSEGMENTATION

RELATED APPLICATIONS

The present patent application is a continuation of, and hereby claims priority under 35 U.S.C § 120 to pending U.S. patent application Ser. No. 16/249,511, entitled "SECURE DIGITAL WORKSPACE USING MACHINE LEARNING AND MICROSEGMENTATION," by the same inventors, filed on 16 Jan. 2019, the contents of which are herein incorporated in their entirety by reference for all purposes.

BACKGROUND

Virtual machines (VMs) may be executed on a host computing device. Each VM provides an abstraction of physical computing resources, such as a processor and memory, of the host executing the VM. The guest operating system and guest software applications executing within a VM may function in a manner similar to how they would function if executing directly on physical resources of the host.

A VM may provide a virtual desktop that is accessible by one or more remote users through a network. A virtual desktop is a VM configured with a guest operating system and desktop software intended for interaction with an end user. Typically, each virtual desktop is configured as a standard physical desktop computer system that, along with productivity applications such as word processors, spreadsheets, email, etc., provide a rich user interface for interaction with a particular user—the user for whom the desktop is configured and to whom the desktop is assigned.

As with physical desktops, each virtual desktop may require a user to supply a username and password to enable the user to access the virtual desktop. The user may be accessing her virtual desktop remotely, which requires the user to supply login credentials through a client computing device. Unauthorized entities may be able to access the user's virtual desktop by stealing the user's username and password, and then logging in through a remote computing device. Thus, additional techniques of user authentication are desired to prevent unauthorized access to virtual desktops.

SUMMARY

Embodiments provide a method of authenticating a user of a computer system, wherein the computer system implements a virtual desktop infrastructure (VDI), the method comprising: connecting to a computing device through a network; receiving from the computing device authentication credentials; determining that the authentication credentials match an authorized user of the computer system; extracting from the computing device values of features of the computing device; retrieving a machine learning (ML) model associated with the authorized user, wherein the ML model is at least one of (a) a supervised ML model or (b) an unsupervised ML model; executing the ML model to authenticate the values of features of the computing device; and based on the executing the ML model, providing the computing device access to a virtual desktop running within a virtual computing instance (VCI) of the computer system.

Further embodiments include a non-transitory computer-readable storage medium storing instructions that, when executed by a computing system, cause the computing device to perform the method set forth above, and a computing system programmed to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The disclosure provides an approach for improving the security of a data center employing virtual desktop infrastructure by including an authentication step performed by a machine learning model, and in some instances, a fingerprint. Compared to previous authentication techniques, machine learning authentication may be able to better determine when a malicious entity is attempting use virtual desktop infrastructure to log-on to a data center. If a user attempting to log in does not pass the machine learning authentication, and also does not pass a secondary authentication (as described below with reference to FIGS. 3, 4 and 5), then the user may still be allowed to log in, but with restricted access privileges. The privileges may be restricted through micro-segmentation. Micro-segmentation is further described below.

Figure 1A:
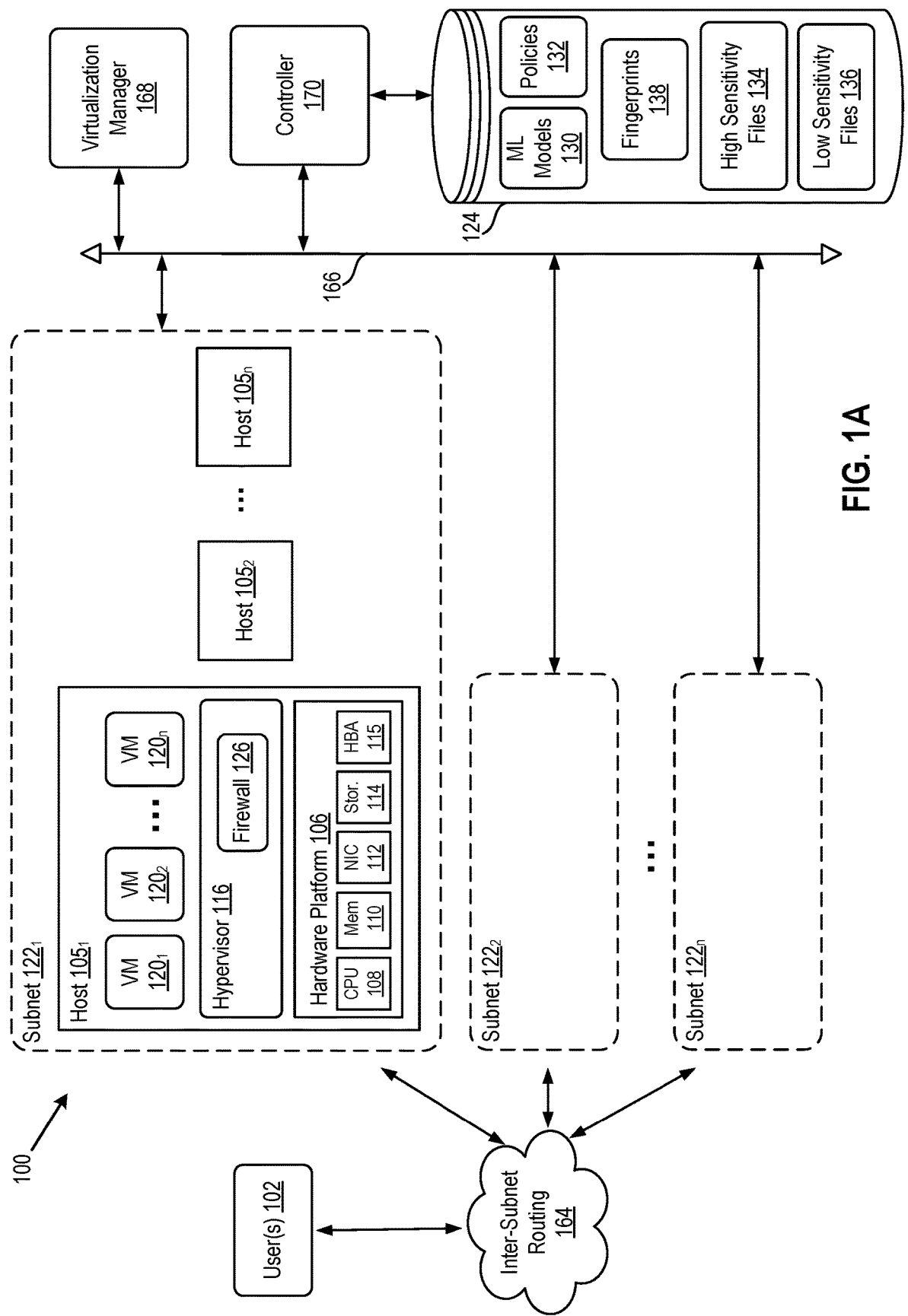
FIG. 1A depicts a block diagram of a data center, in which one or more embodiments of the present disclosure may be utilized.

FIG. 1A depicts a block diagram of a computer system or data center 100, in which one or more embodiments of the present disclosure may be utilized. Data center 100 is divided into one or more subnets $122_1$-$122_n$ (collectively referred to as subnets 122 and individually referred to as subnet 122). A subnet may be defined as a logical subdivision of an IP network, such that the nodes within the subdivision do not need to communicate through a router. In some embodiments, a subnet may be a VLAN (Virtual Local Area Network) or an IP subnet inside a VLAN. In some embodiments, a VLAN contains only one IP subnet. In some embodiments, multiple IP subnets are allocated in a VLAN. In some embodiments, a network subnet includes a set of adjacent VLANs that have high bandwidth and/or low cost links between each other.

Subnets 122 of data center 100 include hosts $105_1$-$105_n$ (collectively referred to as hosts 105 and individually referred to as host 105). Host 105 may be constructed on a server grade hardware platform 106, such as an x86 architecture platform. Hardware platform 106 of host 105 includes one or more processors (CPUs) 108, system memory 110, a network interface 112, storage system 114, a host bus adapter (HBA) 115, and other I/O devices such as, for example, a mouse and keyboard (not shown). HBA 115 may be provided to couple host 105 to one or more external storages, such as a storage area network (SAN) or storage 124, by way of a distinct storage network (not shown) or via data network 164, e.g., when using iSCSI or FCoE storage protocols. In an embodiment, storage 124 may be directly connected to data network 164. "Data network" 164 may also be referred to as "inter-subnet routing" 164.

CPU 108 is configured to execute instructions, for example, executable instructions that perform one or more operations described herein. The instruction may be stored in memory 110 and/or in storage 114. Memory 110 is a device allowing information, such as executable instructions, cryptographic keys, virtual disks, configurations, and other data, to be stored and retrieved. Memory 110 is where programs and data are kept when the processor is actively using them. Memory 110 may be a byte-addressable, random access memory, and memory 110 may include, for example, one or more random access memory (RAM) modules. Memory 110 may be volatile memory or non-volatile memory.

Network interface 112 enables host 105 to communicate with another device via a communication medium, such as via a network within subnet 122 that contains host 105, or via inter-subnet routing 164. Network interface 112 may be one or more network adapters, also sometimes referred to as Network Interface Cards (NICs). Storage system 114 represents persistent one or more storage devices (e.g., one or more hard disks, flash memory modules, solid state disks, and optical disks) in host 105.

Host 105 is configured to provide hypervisor 116, which is a virtualization layer that abstracts processor, memory, storage, and networking resources of hardware platform 106 into multiple virtual machines $120_1$ to $120_n$ (collectively referred to as VMs 120 and individually referred to as VM 120) that run concurrently on the same host. VMs 120 run on top of a software interface layer, referred to herein as a hypervisor 116, that enables sharing of the hardware resources of host 105 by VMs 120. Although certain embodiments are described herein with respect to VMs, the same principles and techniques may also apply to other appropriate virtual computing instances (VCIs) (e.g., containers (e.g., Docker containers), data compute nodes, isolated user space instances, namespace containers, etc.).

Hypervisor 116 may run on top of the operating system in host 104. In some embodiments, hypervisor 116 can be installed as system level software directly on hardware platform 106 of host 104 (often referred to as "bare metal" installation) and be conceptually interposed between the physical hardware and the guest operating systems executing in VMs 120. In some implementations, hypervisor 116 may comprise system level software as well as a "Domain 0" or "Root Partition" virtual machine (not shown) which is a privileged virtual machine that has access to the physical hardware resources of the host and interfaces directly with physical I/O devices using device drivers that reside in the privileged virtual machine. One example of a hypervisor 116 that may be used is a VMware ESXi™ hypervisor provided as part of the VMware vSphere® solution made commercially available from VMware, Inc. of Palo Alto, Calif.

The OS of host 105 may have Remote Desktop Session Host (RDSH) software installed, so as to interact with RDS client installed on the device of user 102. RDSH is a software service on the Windows® operating system, commercially available from Microsoft Corp.

Data center 100 includes an implementation of a logical VM network that connects VMs 120 over the physical network of data center 100. The logical VM network is for data communication among VMs 120. The logical VM network is a software defined network (SDN) that is an overlay network implemented on a physical network of data center 100. An example of a logical network is a Virtual Extensible Local Area Network (VXLAN).

Figure 1B:
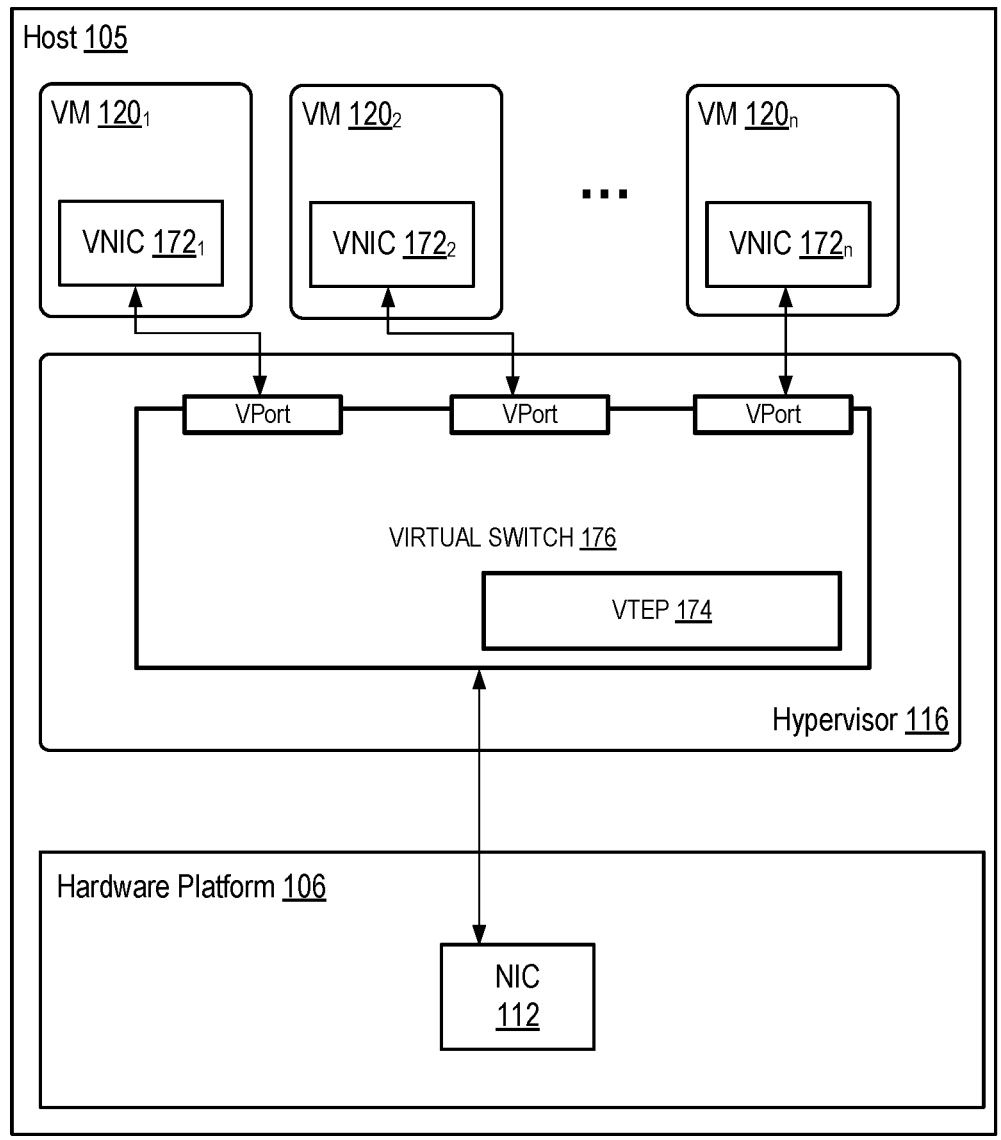
FIG. 1B depicts a block diagram showing details of a hypervisor that supports an SDN overlay network for virtual machines, according to an embodiment.

FIG. 1B depicts a block diagram showing details of hypervisor 116 that supports an SDN overlay network for VMs 120, according to an embodiment. Hypervisor 116 may include a virtual switch 176, which serves as an interface between the hosted VMs 120, NIC 112, as well as other physical resources available on host 105. Hypervisor 116 further includes a hypervisor-based Virtual Extensible Local Area Network (VXLAN) tunnel endpoint (VTEP) 174 which may be implemented in software by virtual switch 176 (or outside of virtual switch 176 and functionally coupled to virtual switch 176 using forwarding tables). Accordingly, VTEP 174 is responsible for providing VTEP services for each of the VMs 120 on the same host machine 105 as VTEP 174.

Each of VMs 120 may include a virtual network interface card (VNIC) 172, which is responsible for exchanging packets between the VM 120 and hypervisor 116. VNICs 172 may be, in some cases, a software abstraction of a physical network interface card. Each VM 120 is connected to a virtual port (vport) provided by virtual switch 176, and virtual switch 176 is connected to physical network interface 112 to allow network traffic to be exchanged between VMs 120 executing on host machine 105 and other network destinations such as VMs 120 hosted by other host machines 105.

The logical VM network is implemented by encapsulating data packets that are generated by VMs 120 for delivery through the underlying physical network. The original packet generated by a source virtual machine is an inner packet. The encapsulated packet generated by host 105, such as through VXLAN encapsulation, may be referred to as an outer packet. For example, VM 120 may generate a packet and send the generated packet to virtual switch 176 implemented in hypervisor 116. Having received the packet, virtual switch 176 then utilizes VTEP 174 to encapsulate the packet received from VM 120 to generate an encapsulated packet that is then sent over the physical network of data center 100 to a target host or other physical endpoint.

Returning to FIG. 1A, hypervisor 116 includes an instance of a distributed firewall 126 (e.g., a distributed firewall that is maintained and controlled across multiple hosts 105 by controller 170) that filters network packets arriving at host 105 and outgoing from host 105. Firewall 126, may comprise multiple software modules for filtering network packets by referencing security or firewall settings of firewall 126. Settings of firewall 126 are determined by rules within policies 132, as described further below. All or substantially all hypervisors 116 within data center 100 may have a running instance of firewall 126. Firewall 126 is capable of being dynamically updated with new security policies in real time by controller 170, and can therefore be considered a "dynamic firewall."

In another embodiment, firewall 126 is located within each VM 120. Firewall 126 in each VM 120 may be implemented as a filter driver to accomplish "micro-segmentation" of networks within data center 100. Distributed firewall 126 configured as per rules of policies 132 may create "micro-segmentation" of networks within data center 100. Micro-segmentation divides a physical network into logical sub-networks to prevent communication across unrelated entities, to establish security around individual or groups of related workloads (e.g., VMs 120), and to provide distributed services that are tailored to requirements of each user 102. Firewall 126 implemented as a filter driver to create micro-segmentation is further described in U.S. patent application Ser. No. 15/879,150 filed Jan. 24, 2018 and entitled "Remote Session Based Micro-Segmentation," which is incorporated by reference herein in its entirety.

Data center 100 includes inter-subnet routing 164, which is a set of network components that provide communication pathways among subnets 122. In an embodiment, inter-subnet routing 164 includes at least one router (not shown). Data traffic between the subnets 122 flows through inter-subnet routing 164, and in an embodiment, inter-subnet routing 164 comprises the "data path" of data center 100 while network 166 comprises the "control path" of data center 100. Inter-subnet routing 164 may be referred to as a "data network," while network 166 may be referred to as a "management network."

In some embodiments, network traffic that takes place within each subnet cannot be directly routed across inter-subnet routing 164, or cannot be routed over without incurring additional cost in terms of time, bandwidth, or computing power. Networks 164, 166, in one embodiment, each provide Layer 3 connectivity in accordance with the Open Systems Interconnection (OSI) model, with internal physical switches and routers not being shown. Although management network 166 and data network 164 are shown as separate physical networks, it is also possible in some implementations to logically isolate the management network from the data network, e.g., by using different VLAN identifiers.

The computing device of user(s) 102 used to access data center 100 may be a component of data center 100 or may be external to data center 100. A device of user 102 may log in to data center 100 through a router within inter-subnet routing 164, or a device of user 102 may log directly into one of hosts 105 without connecting through a router. User 102 may be an entity identifiable by an ID and password pair. The entity may be, for example, an individual or a company. User 102 may log into data center 100 through a network, such as a local area network (LAN), a wide area network (WAN) (e.g., Internet), or through a direct link. User 102 may log into data center 100 through a device such as a desktop, mobile laptop computer, a mobile phone, or a mobile tablet.

In an embodiment, user 102 may have a Remote Desktop Services (RDS) client installed on the device used to connect to data center 100. RDS client may interact with RDSH services installed on host 105 and/or VM 120. RDS is available from available from Microsoft Corp. as part of the Windows® operating system. Device of user 102 may connect to data center 100 using a commercial product for remote desktop virtualization, such as Horizon View™ commercially available from VMware, Inc. of Palo Alto, Calif. Device of user 102 may also connect to data center 100 using Remote Desktop Connection, available from Microsoft Corp. as part of the Windows® operating system, or by using RemoteApp, which is available from Microsoft Corp. Device of user 102 may communicate with data center 100 using a protocol such as Remote Desktop Protocol (RDP), developed by Microsoft Corp.

Data center 100 includes a controller 170 that collects and distributes information about data center 100 from and to components of data center 100. In an embodiment, controller 170 may be an NSX Controller, which is a component of VMware NSX™, commercially available from VMware, Inc. of Palo Alto, Calif.

Controller 170 manages files within storage 124. Although shown as a single unit, it should be understood that controller 170 may be implemented as a distributed or clustered system. Controller 170 may include multiple servers or virtual computing instances that implement controller functions. In some embodiments, controller 170 receives and distributes information located on storage 124 through the physical infrastructure provided by data center 100. Controller 170 may communicate with hosts 105 via management network 166. In some embodiments, controller 170 is a central controller for all subnets of data center 100. Controller 170 may be an NSX™ Controller of VMware, Inc. of Palo Alto, Calif.

Storage 124 may be a storage medium such as a storage array accessible by controller 170. Although storage 124 is shown as located externally to host 105, storage 124 may be implemented as storage 114 on one of hosts 105. Storage 124 includes one or more of a collection of machine learning (ML) models 130, fingerprints 138, security policies 132, high sensitivity files 134, and low sensitivity files 136.

In some embodiments, each ML model of ML models 130 (collectively referred to as ML models 130 and individually referred to as ML model 130) is "per-user" or "user-specific" to one of users 102. ML model 130 may be a supervised ML model or an unsupervised ML model.

Supervised ML models 130 within storage 124 are trained. As known in the art, supervised ML models 130 are created using data sets with labeled input data. A supervised ML model 130 is trained using historical training data of the user 102 associated with that ML model 130. Before training supervised ML model 130, a file of historical training data is compiled and associated with that user 102. The file of historical training data may include values of features of one or more devices used by user 102 to log in to data center 100. As part of creating the historical training data, when user 102 logs into data center 100, controller 170 extracts values of features from the device used by user 102 and adds the values into a file of historical training data that is used to train the supervised ML model. Each set of values of features from a log-on event is labeled as "authentic" or "fraudulent," indicating whether the log-on attempts was by the true user 102 ("authentic" log-on attempt) or by a malicious entity impersonating user 102 ("fraudulent" or "inauthentic" long-on attempt). As used herein with reference to supervised ML models 130, a set of extracted values of features that is also labeled as authentic or inauthentic constitutes a "data point" for training supervised ML model 130. A file of historical training data for supervised ML model 130 includes a plurality of such data points.

The values of features extracted from the device and added to a file of historical training data for user 102 may include the values of any combination of the following features: (1) MAC address of device of user 102, (b) OS of device of user 102, such as for example, Windows, Android, etc., (2) version of OS of device of user 102 and whether the OS is up to date, (3) language of device of user 102 (e.g., German, English, Japanese, etc.), (4) time zone where device of user 102 is located at time of log on, (5) whether anti-virus software is installed on device of user 102, and what anti-virus software is installed, (6) version of anti-virus software on device of user 102 and whether the anti-virus software is up-to-date, (7) whether the anti-virus software has latest malware signatures, (8) date and calendar format of OS of device of user 102, (9) currency for which OS of device of user 102 is configured, (10) IP address of device of user 102, (11) geographical location of device of user 102, (12) whether the IP address of device of user 102 belongs to a black-listed geographical region, (13) which well-known software is installed on device of user 102 (e.g., word processor software, spreadsheet software, etc.), (14) language of plug-ins on device of user 102 (e.g., Adobe Flash®), (15) number of failed log-on attempts in a previous period of time before successful log (e.g., last one minute, two minutes, ten minutes, thirty minutes), (16) time of connection by user 102 to data center 100, and (17) presence of one or more anomalies, such as a connection from San Francisco at 3 PM Pacific Time and then a same day connection at 4 PM Pacific Time from London.

If the device of user 102 is a mobile device, values of additional features may be extracted from the device and added to the file of historical training data for user 102. These additional features are possible from certain mobile devices, such as smart phones, that contain sensors not typically available on desktop devices. Additional features may include any combination of the following: (1) typing speed of user 102, (2) whether left, right, or both hands are used to type, (3) heart rate of user 102, (4) walking speed of user 102, (5) height of user 102 (e.g., may be inferred from whether device is kept in hand or pocket of user 102), (6) type of mobile device of user 102, (7) how user 102 holds the mobile device (e.g., angle of device tilt), and (8) which ear is used for phone conversations, if the device is a phone (e.g., determining by using orientation and motion sensors).

It should be noted that some or all values of the above features may not be directed "extracted" from the device of user 102, but rather, other information such as raw sensor data may be extracted, and some or all of the above values of features may be inferred by processing the raw sensor data.

The supervised ML model 130 may be, for example, a logistic regression model. Within the logistic regression model, each feature may be a variable within the logistic regression algorithm, and each feature may be associated with a weight. The logistic regression model outputs a score which, during training, is classified as "authentic" or "fraudulent" as per the label of the data. After training and during executing of ML model 130, ML model 130 outputs a score based on real time values of features extracted from device of user 102, and that score is classified as "authentic" or "fraudulent," based on historical training data previously collected and on the weights for each feature of historical training data used during training of supervised ML model 130.

Unsupervised ML models 130 within storage 124 may be trained or untrained. As known in the art, unsupervised ML models 130 are created using data sets with unlabeled input data. Unsupervised ML model 130 may be untrained if, for example, unsupervised ML model 130 is an isolation forest ML model, and the isolation forest algorithm has not yet saved a data point to determine what is a "normal" or "authentic" data point, and what is an "anomalous" or "fraudulent" data point, with reference to previously saved data points. A "data point" for an unsupervised ML model may comprise extracted values of features from the device of user 102 at the time of log-on of user 102. The values of features extracted may come from any combination of the features discussed above with reference to trained ML models.

Unsupervised ML model 130 may be, for example, an isolation forest ML model. The contamination factor for the isolation forest model 130 may be, for example, between approximately 0.05 and 0.3. For example, a contamination factor of 0.1 results in a tight fit around what the unsupervised ML model 130 considers a "normal" data point, with few variations of features allowed for a data point to be considered "normal" in comparison to previous data points for that user 102. For another example, a contamination factor of 0.2 results in a wide fit around what the unsupervised ML model 130 considers a "normal" data point, with many variations of features allowed for a data point to be considered "normal" in comparison to previous data points for that user 102.

Storage 124 includes fingerprints 138 or "fingerprint models" 138. In some embodiments, each fingerprint of fingerprints 138 (collectively referred to as fingerprints 138 and individually referred to as fingerprint 138) is "per-user" or "user-specific" to one of users 102. A fingerprint 138 is a list of features associated with user 102. For example, fingerprint 138 may include, in list form, values for any and all features recited above in the discussion of trained ML models 130. A fingerprint 138 may be used to determine whether a log-on attempt is authentic by first associating a fingerprint 138 with user 102. A threshold may be set that specifies the maximum number of features, extracted from the device of user 102 at time of log on, whose values can vary from the values of corresponding features in fingerprint 138. For example, if the threshold is two, and at the time of log-on, the device used by user 102 is (a) located in a time zone that is different from that in fingerprint 138 associated with user 102, and (b) has a different set of anti-virus software installed than specified in fingerprint 138 associated with user 102, then controller 170 may determine that the log-on attempt is fraudulent and inauthentic, and will place user 102 into a "red zone" of access privileges through application of micro-segmentation, as described below.

Controller 170 collects, stores, and/or distributes security policy information about user(s) 102. A security policy 132 (collectively referred to as security policies 132 and individually referred to as security policy 132) may include per-user or user-specific access privileges and limitations. When user 102 logs on to data center 100 and is authenticated, firewall 126 is configured to give the user session created for user 102 certain access and limitations, depending on policy 132 associated with the user 102.

Exemplary privileges and limitations that may be contained within security policy 132 include indications as to whether the device of user 102 may or may not access a certain application, may or may not access files located on a given server, or may or may not access files within a given time window. Security policies may be obtained from existing micro-segmentation services, such as VMware NSX™ made commercially available from VMware, Inc. of Palo Alto, Calif. Security policies may also be created, such as by the method of creating security policies described in U.S. patent application Ser. No. 15/713,702 filed Sep. 25, 2017, now U.S. Publication No. 2018/0176102, published Jun. 21, 2018, which is incorporated by reference herein in its entirety.

Security policies 132 may be enforced by analyzing packet attributes and comparing the attributes to the policies. For example, the source and destination packet attributes may be compared to the security policy of user 102 sending the packet to determine whether user 102 may send the packet to the packet's destination. Security policies 132 may be enforced by a distributed firewall 126 within hypervisors 116 or VMs 120. For further information on using packet attributes to enforce security policies 132, see U.S. patent application Ser. No. 15/708,352 filed Sep. 19, 2017 and entitled "Attribute Enhancement for Handling Network Packet Traffic Between Micro Segmented Guests," which is incorporated by reference herein in its entirety.

Storage 124 includes high sensitivity files 134 and low sensitivity files 136. In an embodiment, user 102 has access to both high sensitivity files 134 and low sensitivity files 136 when user 102 is successfully authenticated at log on. Although high sensitivity files 134 and low sensitivity files 136 are shown as located within storage 124, files 134/136 may be located in any storage or memory medium in data center 100, such as for example, distributed throughout storages 114 of hosts 105. Access to both low and high sensitivity files may be allowed when user is in a "green zone" of access permissions or privileges through application of micro-segmentation. In an embodiment, user 102 has access to low sensitivity files 136 and not to high sensitivity files 134. Access to low sensitivity 136 but not high sensitivity files 134 may be allowed when user is in a "red zone" of access permissions or privileges. A distinction between high sensitivity files 134 and low sensitivity files 136 may be that high sensitivity files 134 are shared among a plurality of users 102 within data center 100, while low sensitivity files 136 are files specific to one of users 102 to which only that user 102 has access. Another distinction may be that high sensitivity files 134 may contain highly sensitive information, such as private data of user 102, or confidential/proprietary data of an organization to which user 102 belongs.

Placing user 102 into a red zone or a green zone of access privileges includes configuring firewall 126 to as to give user 102 certain access privileges and/or limitations, or micro-segmenting the user's network or firewall 126 to prevent the user from accessing certain files or subnets. Configuring firewall 126 may be performed by retrieving the security policy 132 that pertains to user 102 and configuring firewall 126 to comply with that policy, and optionally to additionally configure firewall 126 to comply with the red zone and green zone distinction, as described above. Further information on configuring firewall 126 may be found in U.S. patent application Ser. No. 15/879,150, incorporated by reference above.

Data center 100 includes a management component, depicted in FIG. 1A as virtualization manager 168, that may communicate with hosts 105 via a network 166, sometimes referred to as a management network. In one embodiment, virtualization manager 168 is a computer program that executes in a central server in data center 100, or alternatively, virtualization manager 168 may run in a VM, e.g. in one of hosts 105. One example of a virtualization manager is the vCenter Server™ product available from VMware, Inc. Virtualization manager 168 is configured to carry out administrative tasks for data center 100, including managing hosts 105, managing VMs 120, provisioning VMs, transferring VMs from one host to another host, transferring VMs from data center 100 to another network or data center (not shown), and load balancing between hosts 105, and between data center 100 and other networks. An example of a tool that may be used to perform a VM transfer between hosts is VMware VMotion™, which is commercially available from VMware, Inc. of Palo Alto, Calif.

Figure 2:
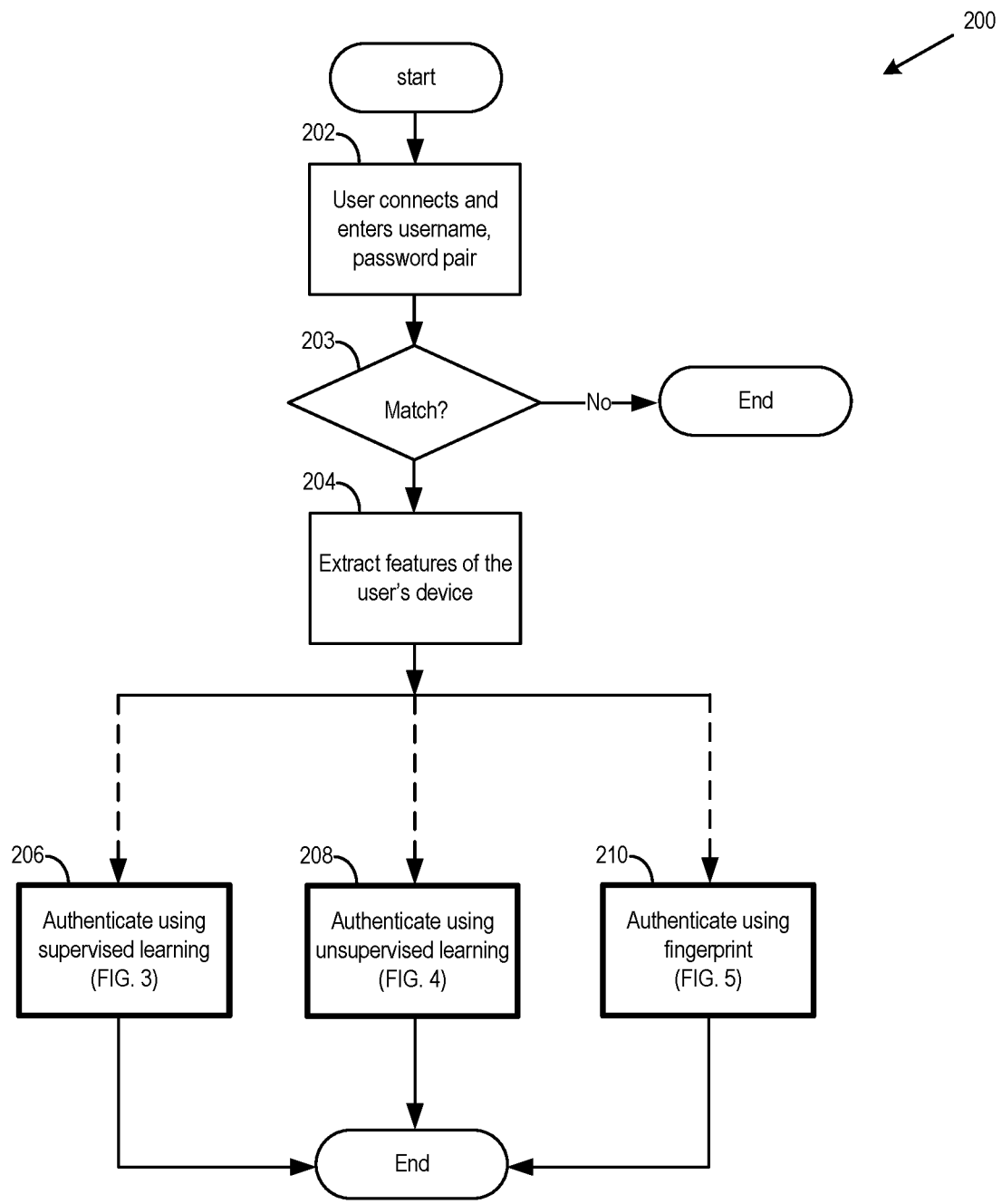
FIG. 2 depicts a flow diagram of a method of authenticating a user, according to an embodiment.

FIG. 2 depicts a flow diagram of a method 200 of authenticating user 102, according to an embodiment. Method 200 is described as performed by controller 170, but method 200 may be performed by another component of data center 100, such as an authentication module (not shown), and some blocks of method 200 may be performed by a user environment manager (UEM), which is described in U.S. patent application Ser. No. 15/879,150, incorporated by reference above.

At block 202, user 102 connects to data center 100. User 102 may be presented with an interface allowing user 102 to enter authentication credentials, such as a username and password pair. As part of block 202, user 102 enters authentication credentials.

At block 203, controller 170 checks the authentication credentials entered at block 202, such as by checking whether the username matches the password. If the authentication credentials do not match an authorized user of data center 100, then method 200 ends. Optionally, if the authentication credentials do not match an authorized user of data center 100, method 200 returns to block 202 to allow user 102 to retry entering authentication credentials. If the authentication credentials match an authorized user of data center 100, then method 200 continues to block 204.

At block 204, controller 170 extracts features of the computing device used by user 102 when connecting to database 100 at block 202. The features may be some or all of the features recited above in the discussion of trained ML models 130.

After block 204, method 200 continues to one of blocks 206, 208, or 210, depending on implementation. If method 200 is implemented to authenticate user 102 using a supervised ML model 130, then method 200 continues to block 206. Block 206 is described in detail in FIG. 3, below. If method 200 is implemented to authenticate user 102 using an unsupervised ML model 130, then method 200 continues to block 208. Block 208 is described in detail in FIG. 4, below. If method 200 is implemented to authenticate user 102 using a fingerprint 138, then method 200 continues to block 210. Block 210 is described in detail in FIG. 5, below.

Although method 200 is described as performing one of unsupervised machine learning authentication, supervised machine learning authentication, or fingerprint authentication, method 200 may be implemented such that two or more of these authentications successfully pass before user 102 is authenticated into the "green zone."

Figure 3:
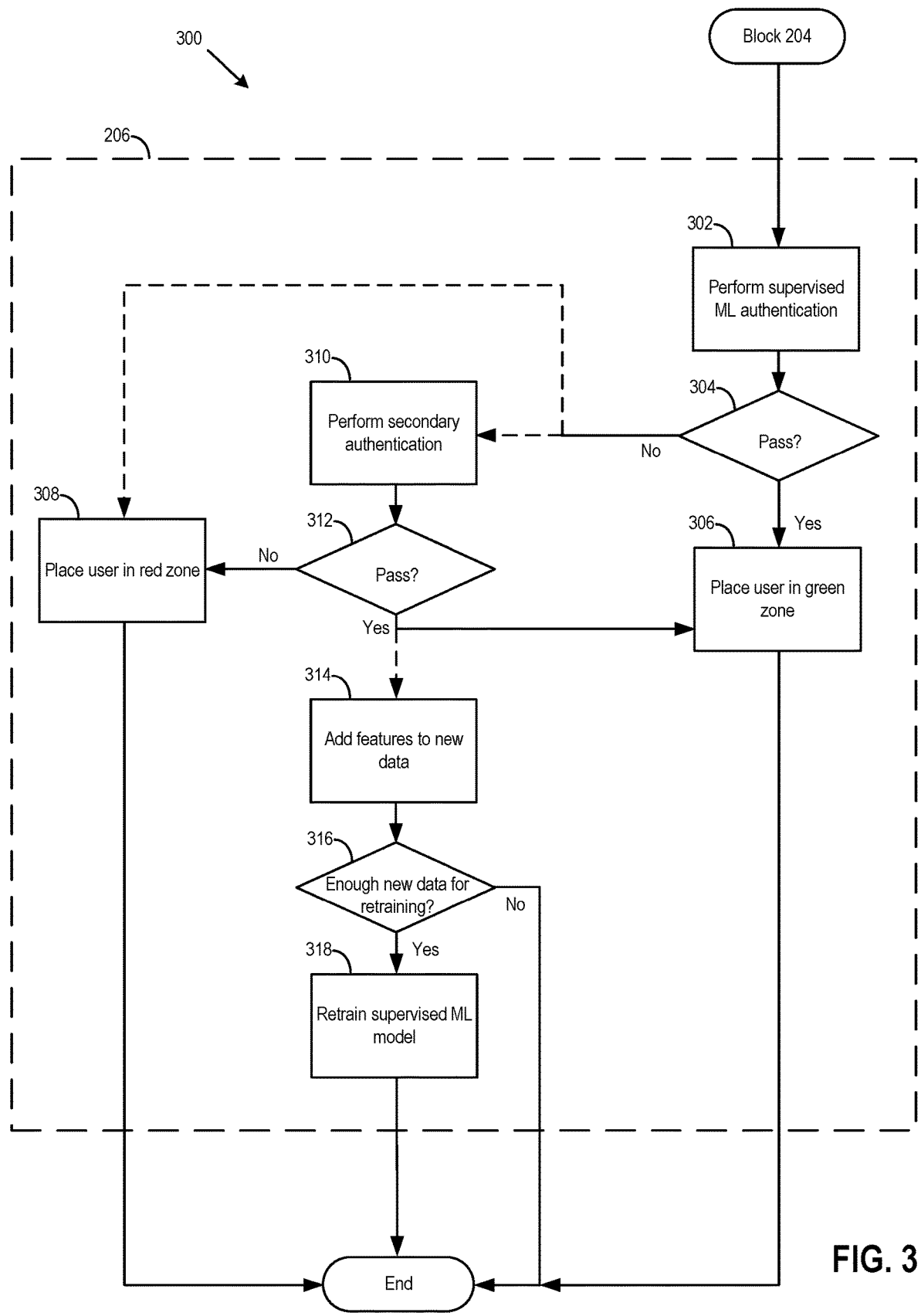
FIG. 3 depicts a flow diagram of a method of authenticating a user using a supervised machine learning model, according to an embodiment.

FIG. 3 depicts a flow diagram of a method 300 of authenticating user 102 using supervised ML model 130, according to an embodiment. FIG. 3 is an expanded view of block 206 of FIG. 2.

At block 302 of method 300, controller 170 retrieves from storage 124 a trained supervised ML model 130 associated with user 102, the association determined by the username and password pair (or other authentication credentials) of user 102 entered in block 202. Controller 170 enters as input into the retrieved supervised ML model 130 the features of the device that is being by user 102, those features having been extracted at block 204, above. Using the input, supervised ML model 130 outputs a score that corresponds to whether user 102 has passed authentication by the supervised ML model 130 or whether user 102 has not passed authentication by the supervised ML model 130.

At block 304, controller 170 determines whether user 102 has passed authentication by supervised ML model 130. If so, then method 300 continues to block 306. If not, then method 300 continues to one of blocks 308 or 310, depending on implementation.

That is, if user 102 does not pass ML authentication as determined at block 304, then method 300 may continue to block 308, in which user 102 is placed into a red zone of access privileges within data center 100, through application of micro-segmentation. As described above, placing user 102 into a red zone of access privileges includes configuring firewall 126 so as to give user 102 certain access privileges and/or limitations. After block 308, method 300 ends.

As an alternative to performing block 308, method 300 may continue to block 310 from block 304 and to perform blocks 310-318 that provide user 102 a chance to be re-authenticated and placed into the green zone, through micro-segmentation, as well as to collect new data for retraining of supervised ML model 130 associated with user 102.

At block 306, user 102 is placed into a green zone of access privileges, through application of micro-segmentation. As described above, placing user 102 into a green zone of access privileges includes configuring firewall 126 so as to give user 102 certain access privileges and/or limitations. After block 306, method 300 ends.

Optionally, method 300 may continue to block 310 from block 304. Block 310 is reached if user 102 fails authentication by supervised ML model 130 at block 304. At block 310, controller 170 performs secondary authentication of user 102. As used herein, "secondary authentication" refers to any additional authentication that may be performed (a) after authentication credentials of user 102 matched credentials of an authorized user of data center 100 at block 203, and (b) after user 102 did not pass authentication by unsupervised ML model 130 at block 402, (c) so as to obtain a high confidence that despite not passing the ML authentication, user 102 is the user associated with the authentication credentials entered at block 202. For example, secondary authentication may include sending a token, such as a numerical code, to a device registered with data center 100, the device being associated with user 102. The device may be a different device than the device used to connect to data center 100 at block 202. User 102 then enters into a user interface between user 102 and data center 100, the token sent to the registered device.

At block 312, controller 170 determines if user 102 has passed secondary authentication. Continuing the above example, user 102 may pass the secondary authentication if the token entered by user 102 matches the token sent by controller 170 to the registered device. If user 102 passed secondary authentication, then method 300 continues to block 306, where user 102 is placed into the green zone through micro-segmentation, as described above. Also if user 102 passed secondary authentication, then optionally, method 300 may also continue to block 314. If secondary authentication does not pass, then method 300 continues to block 308, where user 102 is placed into the red zone through micro-segmentation, as described above.

At block 314, controller 170 adds features extracted at block 204 to historical training data that was used to train supervised ML model 130 associated with the authentication credentials of user 102 entered at block 202. Controller 170 labels these features as an authentic log-on attempt, and through the labeling, creates a new data point within the historical training data.

At block 316, controller 170 determines whether enough new data has been collected for retraining of supervised ML model 130 associated with user 102. "New data" in this determination refers to data that was not used to train supervised ML model 130, and/or that was generated after the latest occurrence of training of supervised ML model 130. If enough new data has been generated, then method 300 continues to block 318. If not, then method 300 ends.

At block 318, controller 170 retrains supervised ML model 130 associated with the authentication credentials of user 102. The retraining may use new data as well as old data previously used to train supervised ML model 130, the new data having been collected at least in part through the secondary authentication process described above in blocks 310, 312, and 314. After block 318, method 300 ends.

Figure 4:
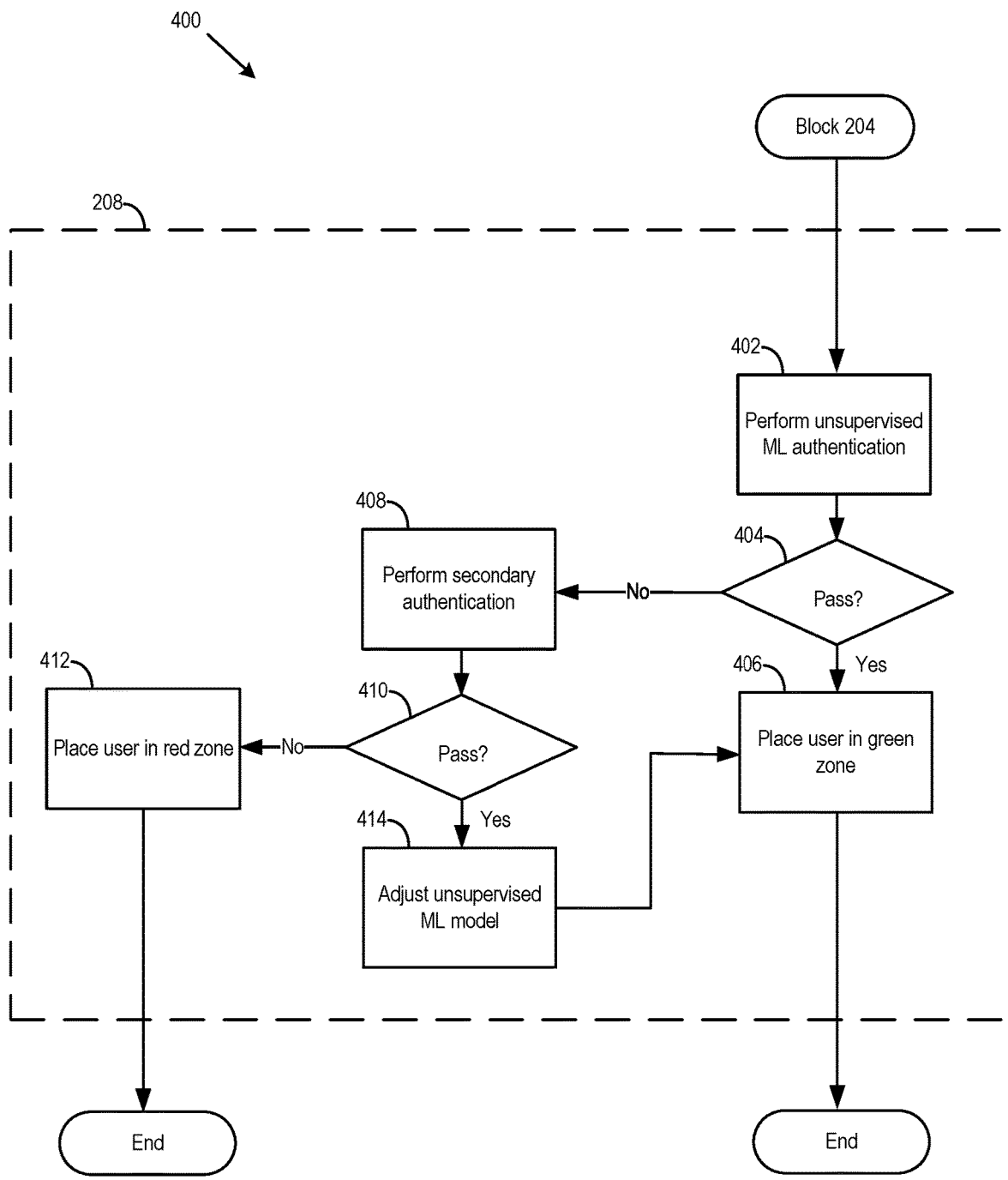
FIG. 4 depicts a flow diagram of a method of authenticating a user using an unsupervised machine learning model, according to an embodiment.

FIG. 4 depicts a flow diagram of a method 400 of authenticating user 102 using unsupervised ML model 130, according to an embodiment. FIG. 4 is an expanded view of block 208 of FIG. 2.

At block 402 of method 400, controller 170 retrieves from storage 124 an unsupervised ML model 130 associated with user 102, the association determined by the username and password pair (or other authentication credentials) of user 102 entered in block 202. Controller 170 enters as input into the retrieved unsupervised ML model 130 the features of the device of user 102, those features having been extracted at block 204. Using the input, unsupervised ML model 130 outputs whether the extracted features are anomalous or normal. If the extracted features are anomalous, then user 102 has not passed authentication by the unsupervised ML model 130, and if the features are normal, then user 102 has passed the authentication.

At block 404, controller 170 determines whether user 102 has passed authentication by unsupervised ML model 130. If so, then method 400 continues to block 406. If not, then method 400 continues to block 408.

At block 406, user 102 is placed into a green zone of access privileges through micro-segmentation. As described above, placing user 102 into a green zone of access privileges includes configuring firewall 126 so as to give user 102 certain access privileges and/or limitations. After block 406, method 400 ends.

At block 408, controller 170 performs secondary authentication of user 102. The secondary authentication of block 408 may be substantially similar to the secondary authentication of block 310, described above. That is, secondary authentication may be any additional authentication that may be performed (a) after authentication credentials of user 102 matched credentials of an authorized user of data center 100 at block 203, and (b) after user 102 did not pass authentication by supervised ML model 130 at block 402, (c) so as to obtain a high confidence that despite not passing the ML authentication, user 102 is the user associated with the authentication credentials entered at block 202.

At block 410, controller 170 determines whether user 102 passed secondary authentication. If user 102 passed secondary authentication, then method 400 continues to block 414. If user 102 did not pass secondary authentication, then method 400 continues to block 412, where user 102 is placed into the red zone through micro-segmentation, as described above. After block 412, method 400 ends.

At block 414, unsupervised ML model 130 associated with the authentication credentials of user 102 is adjusted to fit the features extracted at block 204. Unsupervised ML model 130 is adjusted by changing the bounds around data points of unsupervised ML model 130 so as to fit the data point representing the extracted features. Refitting unsupervised ML model 130 in such a way results in ML authentication passing next time the same features are extracted, or next time similar features are extracted. What features are "similar" for ML authentication may be defined, for example, by a contamination factor, as described above.

After block 414, method 400 continues to block 406 where user 102 is placed into the green zone through micro-segmentation, as described above. After block 406 method 400 ends.

Figure 5:
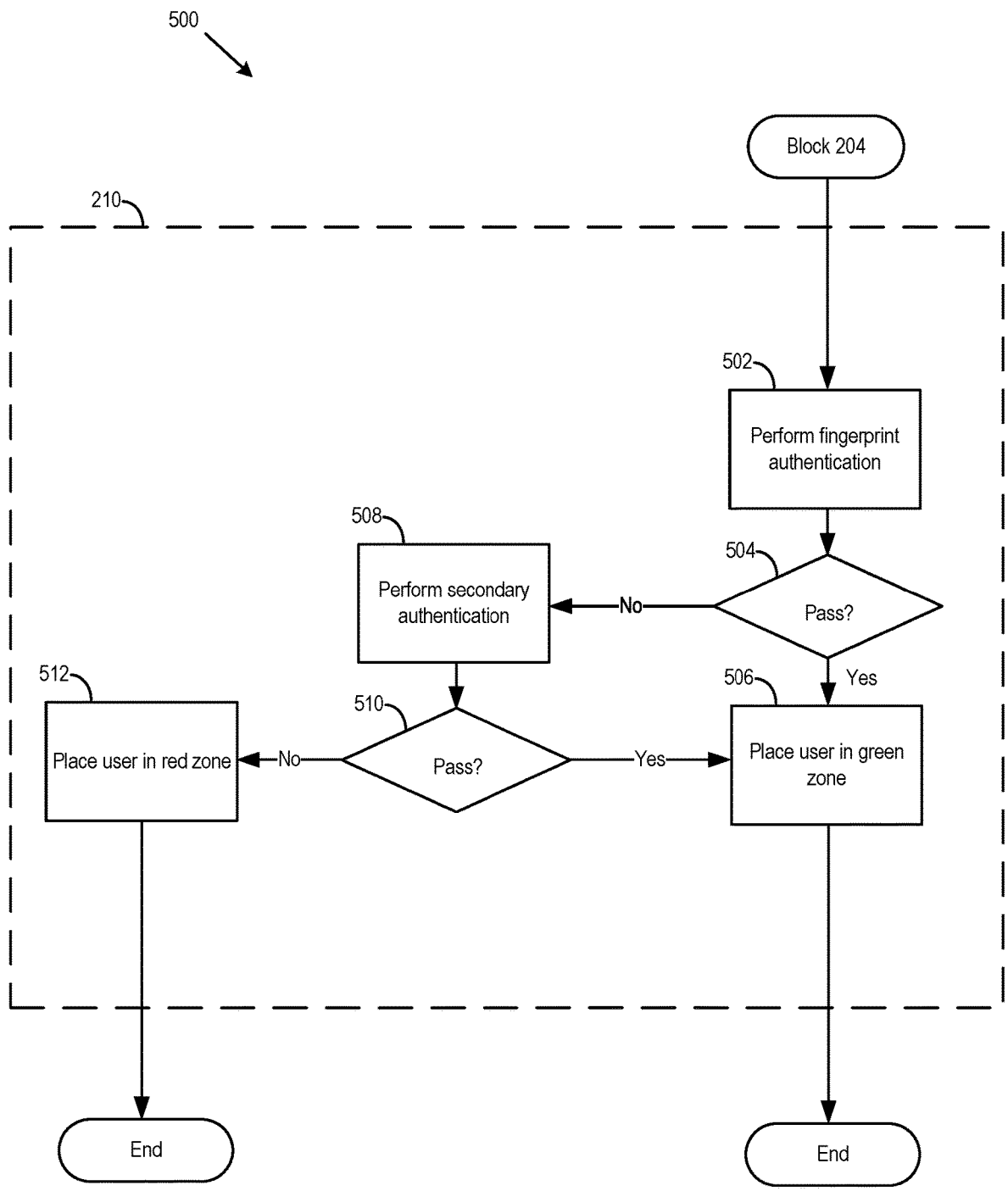
FIG. 5 depicts a flow diagram of a method of authenticating a user using a fingerprint, according to an embodiment.

FIG. 5 depicts a flow diagram of a method 500 of authenticating user 102 using fingerprint 138, according to an embodiment. FIG. 5 is an expanded view of block 210 of FIG. 2.

At block 502 of method 500, controller 170 retrieves from storage 124 a fingerprint 138 associated with user 102, the association determined by the username and password pair (or other authentication credentials) of user 102 entered in block 202. Controller 170 compares the retrieved fingerprint to the features extracted at block 204.

At block 504, controller 170 determines whether user 102 has passed fingerprint authentication. For example, if a threshold number of extracted features do not match features in fingerprint 138, then fingerprint authentication fails. If fingerprint authentication fails, then method 500 continues to block 508. If fingerprint authentication passes, then method 500 continues to block 506.

At block 506, user 102 is placed into a green zone of access privileges through micro-segmentation, as described above. After block 506, method 500 ends.

At block 508, controller 170 performs secondary authentication of user 102. The secondary authentication may be substantially similar to the secondary authentication of block 310, described above. That is, secondary authentication may be any additional authentication that may be performed (a) after authentication credentials of user 102 matched credentials of an authorized user of data center 100 at block 203, and (b) after user 102 did not pass authentication by fingerprint 138 at block 502, (c) so as to obtain a high confidence that despite not passing the fingerprint authentication, user 102 is the user associated with the authentication credentials entered at block 202.

At block 510, controller 170 determines whether user 102 passed secondary authentication. If user 102 passed secondary authentication, then method 500 continues to block 506, where user 102 is placed into the green zone through micro-segmentation, as described above. After block 506, method 500 ends. If user 102 did not pass secondary authentication, then method 500 continues to block 512, where user 102 is placed into the red zone through micro-segmentation, as described above. After block 512, method 500 ends.

After successful authentication of user 102, a VDI client may be established within VM 120 assigned to user 102, the VM 120 being the VM in which a user session or RDSH session for user 102 is created and is executing. A VDI client is further described within U.S. Patent Publication No. 2016/0216860 published Jul. 28, 2018, which is incorporated by reference herein in its entirety.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory, persistent memory, solid state disk (e.g., a flash memory device), NVMe device, a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of authenticating a user of a computer system, wherein the user accesses the computer system using a computing device through a network, wherein the computer system implements a virtual desktop infrastructure (VDI), the method comprising:
   receiving, from the computing device, authentication credentials;
   determining that the authentication credentials match an authorized user of the computer system;
   extracting, from the computing device, values of features of the computing device;
   retrieving a machine learning (ML) model associated with the authorized user, wherein the ML model is at least one of (a) a supervised ML model or (b) an unsupervised ML model;
   executing the ML model to authenticate the values of features of the computing device; and
   based on one or more of the values of features of the computing device not being authenticated by the ML model:
      providing the computing device access to a virtual desktop running within a virtual computing instance (VCI) of the computer system; and
      restricting access privileges associated with the computing device with respect to the virtual desktop based on micro-segmentation through which one or more networks associated with the virtual desktop are divided into logical sub-networks such that the computing device is prevented from accessing one or more of the logical sub-networks.

2. The method of claim 1, wherein the ML model is an unsupervised ML model, and wherein the method further comprises:
   performing a secondary authentication process to determine whether a user using the computing device is the authorized user; and
   based on the secondary authentication process determining that the user using the computing device is the authorized user, refitting the ML model such that bounds of normal data points encompass a data point represented by the values of features of the computing device.

3. The method of claim 2, wherein the ML model is an isolation forest model having a contamination factor between 0.05 and 0.3.

4. The method of claim 1, wherein the ML model is a supervised ML model, and wherein the method further comprises:
   performing a secondary authentication process to determine whether a user using the computing device is the authorized user;
   based on the secondary authentication process determining that the user using the computing device is the authorized user, adding the extracted values of features to a historical training file; and
   retraining the supervised ML model using the historical training file.

5. The method of claim 4, wherein the ML model is a logistic regression model.

6. The method of claim 1, the method further comprising performing a fingerprint authentication by comparing the values of features of the computing device to corresponding values of features in the fingerprint, wherein a successful fingerprint authentication is based on whether values of features that are different between the corresponding values of features of the fingerprint and the values of features of the computing device satisfy a threshold.

7. The method of claim 1, the method further comprising, subsequent to the executing the ML model to authenticate the values of features of the computing device:
   assigning the VCI to the computing device, wherein the VCI is executing within a host computer of the computer system;
   establishing a user session within the VCI for the computing device; and
   executing a VDI client within the VCI, the VDI client configured to transmit a virtual desktop to the computing device.

8. The method of claim 7, the method further comprising, based on the one or more of the values of features of the computing device not being authenticated by the ML model, configuring a firewall within the host computer such that the computing device has access to low sensitivity files but does not have access to high sensitivity files.

9. The method of claim 8, wherein the firewall is executing within the VCI.

10. A system for authenticating a user of a computer system, wherein the user accesses the computer system using a computing device through a network, wherein the computer system implements a virtual desktop infrastructure (VDI), the system comprising:
   at least one memory; and
   at least one processor coupled to the at least one memory, the at least one processor and the at least one memory configured to cause the system to:
      receive, from the computing device, authentication credentials;

determine that the authentication credentials match an authorized user of the computer system;

extract, from the computing device, values of features of the computing device;

retrieve a machine learning (ML) model associated with the authorized user, wherein the ML model is at least one of (a) a supervised ML model or (b) an unsupervised ML model;

execute the ML model to authenticate the values of features of the computing device; and based on one or more of the values of features of the computing device not being authenticated by the ML model:

provide the computing device access to a virtual desktop running within a virtual computing instance (VCI) of the computer system; and restrict access privileges associated with the computing device with respect to the virtual desktop based on micro-segmentation through which one or more networks associated with the virtual desktop are divided into logical sub-networks such that the computing device is prevented from accessing one or more of the logical sub-networks.

11. The system of claim 10, wherein the ML model is an unsupervised ML model, and wherein the at least one processor and the at least one memory are further configured to cause the system to:

perform a secondary authentication process to determine whether a user using the computing device is the authorized user; and based on the secondary authentication process determining that the user using the computing device is the authorized user, refitting the ML model such that bounds of normal data points encompass a data point represented by the values of features of the computing device.

12. The system of claim 11, wherein the ML model is an isolation forest model having a contamination factor between 0.05 and 0.3.

13. The system of claim 10, wherein the ML model is a supervised ML model, and wherein the at least one processor and the at least one memory are further configured to cause the system to:

perform a secondary authentication process to determine whether a user using the computing device is the authorized user;

based on the secondary authentication process determining that the user using the computing device is the authorized user, add the extracted values of features to a historical training file; and retrain the supervised ML model using the historical training file.

14. The system of claim 13, wherein the ML model is a logistic regression model.

15. The system of claim 10, wherein the at least one processor and the at least one memory are further configured to cause the system to perform a fingerprint authentication by comparing the values of features of the computing device to corresponding values of features in the fingerprint, wherein a successful fingerprint authentication is based on whether values of features that are different between the corresponding values of features of the fingerprint and the values of features of the computing device satisfy a threshold.

16. The system of claim 10, wherein the at least one processor and the at least one memory are further configured to cause the system to, subsequent to executing the ML model to authenticate the values of features of the computing device:

assign the VCI to the computing device, wherein the VCI is executing within a host computer of the computer system;

establish a user session within the VCI for the computing device; and execute a VDI client within the VCI, the VDI client configured to transmit a virtual desktop to the computing device.

17. The system of claim 16, wherein the at least one processor and the at least one memory are further configured to cause the system to, based on the one or more of the values of features of the computing device not being authenticated by the ML model, configure a firewall within the host computer such that the computing device has access to low sensitivity files but does not have access to high sensitivity files.

18. The system of claim 17, wherein the firewall is executing within the VCI.

19. A non-transitory computer-readable medium storing instructions that, when executed by one or more processors, cause the one or more processors to:

receive from a computing device authentication credentials related to authenticating a user of a computer system, wherein the user accesses the computer system using the computing device through a network, wherein the computer system implements a virtual desktop infrastructure (VDI);

determine that the authentication credentials match an authorized user of the computer system;

extract from the computing device values of features of the computing device;

retrieve a machine learning (ML) model associated with the authorized user, wherein the ML model is at least one of (a) a supervised ML model or (b) an unsupervised ML model;

execute the ML model to authenticate the values of features of the computing device; and based on one or more of the values of features of the computing device not being authenticated by the ML model:

provide the computing device access to a virtual desktop running within a virtual computing instance (VCI) of the computer system; and restrict access privileges associated with the computing device with respect to the virtual desktop based on micro-segmentation through which one or more networks associated with the virtual desktop are divided into logical sub-networks such that the computing device is prevented from accessing one or more of the logical sub-networks.

20. The non-transitory computer-readable medium of claim 19, wherein the ML model is an unsupervised ML model, and wherein the instructions, when executed by the one or more processors, further cause the one or more processors to:

perform a secondary authentication process to determine whether a user using the computing device is the authorized user; and based on the secondary authentication process determining that the user using the computing device is the authorized user, refitting the ML model such that bounds of normal data points encompass a data point represented by the values of features of the computing device.

* * * * *